United States Patent [19]

Gibbs

[11] 3,967,134

[45] *June 29, 1976

[54] ELECTRICAL CONTROL APPARATUS

[75] Inventor: James Whitman Gibbs, Hialeah, Fla.

[73] Assignee: Flo-Start, Inc., Akron, Ohio

[ * ] Notice: The portion of the term of this patent subsequent to Apr. 15, 1992, has been disclaimed.

[22] Filed: Jan. 15, 1975

[21] Appl. No.: 540,430

[52] U.S. Cl. .............................. 307/115; 318/139; 200/209
[51] Int. Cl.² ....................................... H01H 19/14
[58] Field of Search ..................... 200/182–236; 339/5 L, 8 L; 335/48, 54, 72, 125, 138; 318/139, 349; 307/115

[56] References Cited
UNITED STATES PATENTS

| | | | |
|---|---|---|---|
| 2,047,902 | 7/1936 | Eitzen | 200/209 |
| 2,856,486 | 10/1958 | O'Neill | 200/225 |
| 3,878,349 | 4/1975 | Gibbs | 200/209 |

Primary Examiner—Robert K. Schaefer
Assistant Examiner—M. Ginsburg
Attorney, Agent, or Firm—Hamilton, Renner & Kenner

[57] ABSTRACT

An electrical control unit for interconnection between a source of electrical energy and an electrically driven unit including a slide surface composed in part of electrically nonconductive material, a plurality of conductive discrete contact elements arranged in the slide surface, a conductive liquid contact adapted to progressively engage certain of the conductive discrete contact elements in the slide surface to provide a variable magnitude electrical output, and/or one or more conductive liquid contacts adapted to engage other of the discrete contact elements in the slide surface to effect a switching operation with respect to the variable magnitude electrical output or other electrical signal.

42 Claims, 9 Drawing Figures

ELECTRICAL CONTROL APPARATUS

CROSS REFERENCE TO RELATED APPLICATION

This is a continuation-in-part of my copending application Ser. No. 385,067, filed Aug. 2, 1973, entitled "Direct Current Control Means", now U.S. Pat. No. 3,878,349 issued Apr. 15, 1975.

BACKGROUND OF THE INVENTION

In general, the invention relates to a control unit for transferring electrical energy from a power source to a driven unit which may for instance be capable of converting electrical energy to a mechanical output. More particularly, the invention relates to a control unit for instituting and regulating the flow of electrical energy from a power source to such a driven unit. More specifically, the invention relates to a control unit operable with a power source and a driven unit to selectively institute current flow through one or more paths to the driven unit, to provide regulation of the amount of current flow from none to the full capacity of the power source, and/or to provide for combined integrated operation for both the institution and regulation of current flow, if desired.

It has been known for many years that a power source such as a blank of batteries may be employed to provide direct current for powering a driven unit such as a motor to run small vehicles in the nature of golf carts and industrial trucks. Except in the use of extremely sophisticated and expensive controls, anyone familiar with the operation of such vehicles is well aware of their tendencies to lurch or jerk in varying degrees upon the institution of current flow or when a power change is effected by an increase or decrease in the current flow to the motor. Such irregular or non-smooth operating characteristics at least minimally constitute an irritation to vehicle occupants and in some instances produce dangerous safety conditions as when older persons operate golf carts or when industrial trucks are operated in close proximity to other workers or on raised loading docks.

It is also widely recognized that such vehicles have undue maintenance problems in regard to the control units which institute and regulate the current flow from a battery to the drive motor. Characteristically such control units employ a plurlaity of relatively movable solid contacts which incrementally provide variation in the current flow. The initial lurching accompanying adjustment of such control units to effect a change in current flow is noted for becoming progressively worse during operation at high load starts, as when a vehicle is started on an incline, or repetitious institution of low current flow, as when endeavors are made to inch a vehicle a short distance in one direction or another, since these conditions tend to produce arcing and heat which may damage the contacts. These problems are intensified in the higher power ranges necessary in conjunction with larger driven units such as those employed in industrial trucks wherein arcing may effect actual welding of the contacts.

The unsatisfactory performance and maintenance characteristics of the various solid contact devices which have been employed has prompted efforts to develop other types of control devices for those applications; however none have proven to be satisfactory in all respects. For example, various rheostat type devices have evolved wherein a movable contact engages a helical coil of wire. Such rheostat devices are, however, extremely limited in current carrying capacity. More recently, efforts have been made to develop solid state control units; however, cost considerations have limited the number of applications for such units.

SUMMARY OF THE INVENTION

It is an object of particularly the first embodiment of this invention preferably for low power applications to provide an improved control unit for regulating the flow of current from a power source to a unit to be driven by the energy and which driven unit in operation customarily requires a range of current flow or energy demand. It is another object of particularly the first embodiment of this invention to provide a manually operable control unit to regulate current flow from a current source which includes (a) a plurality of electrical contacts connected to a power source and adapted to deliver to each of the contacts a different current flow, (b) a plurality of contacts comprising spaced portions of an otherwise nonconductive slide surface, (c) a slide member having a sliding nonconductive surface which carries a captivated pool of electrically nonconductive material into and out of electrical engagement serially with the contacts of the slide surface on movement of the slide member, (d) an electrical circuit which connects the pool to the device to be energized, and (e) preferably, a balance circuit which connects the pool with the first electrical contact in the line of travel of the slide member which counteracts arcing on initiation of sliding movement and current flow, the balance circuit avoiding problems of arcing.

It is another and more specific object of particularly the first embodiment of the invention to provide a slide member of nonconductive material which carries with it a captivated ring of conductive material such as mercury which serves as a movable electrical switch contact and a slide surface with spaced electrical contacts connected to current source means, including an impedence element, so that the current delivered to each of the contacts is different, and in which a balance circuit means may be provided, as described hereinafter, to provide means to overcome problems of arcing upon initiation of movement of the movable contact into engagement with the first contact in the line of travel.

An object of particularly the second embodiment of the present invention is to provide an improved electrical control unit for regulating the flow of current from a power source to a driven unit through one or more paths for a smooth, nonarcing initiation and variation of current flow through the entire range of energy demand. Another object of this embodiment of the invention is to provide a first control which is operable to selectively condition the control unit to provide a change from a neutral position to forward and reverse positions of the driven unit. A further object of this embodiment of the invention is to provide a second control operable to selectively increase or decrease the forward or reverse speed of the driven unit within a predetermined speed range.

Yet another object of this embodiment of the invention is to provide a first contact assembly operably engageable by a first movable slide, carried by the first control, to determine the forward and reverse energization of the driven unit; the first movable slide having a pair of captivated mercury pools for selective sliding engagement with a common and either of a pair of other contact elements comprising the first contact assembly to determine the direction of current flow as to a drive motor of the driven unit. A still further object of this embodiment of the invention is to provide a second contact assembly operably engageable by a second movable slide carried by the second control, to selectively increase or decrease the forward or reverse speed of the driven unit; said second contact assembly comprising a plurality of discrete contact elements electrically connected to points in spaced relation along the length of an impedence element and said second movable slide comprising a single captivated mercury pool for selective sliding engagement with the plurality of contact elements to effect a change in the magnitude of current flow to the driven unit.

Another object of this embodiment of the invention is to provide first and second contact elements in a nonconductive slide surface and mercury pools movable along the slide surface to sequentially form electrical contact between the respective contact elements by the proper manipulations of the first and second manual control means whereby the direction of operation is selected and the magnitude of current flow to the driven unit is smoothly and accurately controlled. A further object of this embodiment of the invention is to provide a first interlock to lock the first manual control in the neutral position, a second interlock assembly to selectively lock the first manual control in either of the forward or reverse positions, and a third interlock to prevent movement of the first manual control from either the neutral, forward, or reverse positions while the driven unit is under electrical load. Still another object of the invention is to provide a control unit which can be made in a relatively simple compact configuration with an extended service life and high reliability.

These and other objects, together with the advantages thereof over existing and prior art forms which will become apparent from the following specification, are accomplished by the means hereinafter described and claimed.

In general, an electrical control unit for interconnection between a source of electrical energy and an electrically driven unit embodying the concept of the present invention includes a slide surface composed in part of electrically nonconductive material, a plurality of conductive discrete contact elements arranged in the slide surface, a conductive liquid contact adapted to progressively engage certain of the discrete contact elements in the slide surface to provide a variable magnitude electrical output, and/or one or more conductive liquid contacts adapted to engage discrete contact elements in the slide surface to effect a switching operation with respect to the variable magnitude electrical output or other electrical signal.

DESCRIPTION OF THE PREFERRED EMBODIMENTS

Figure 1:
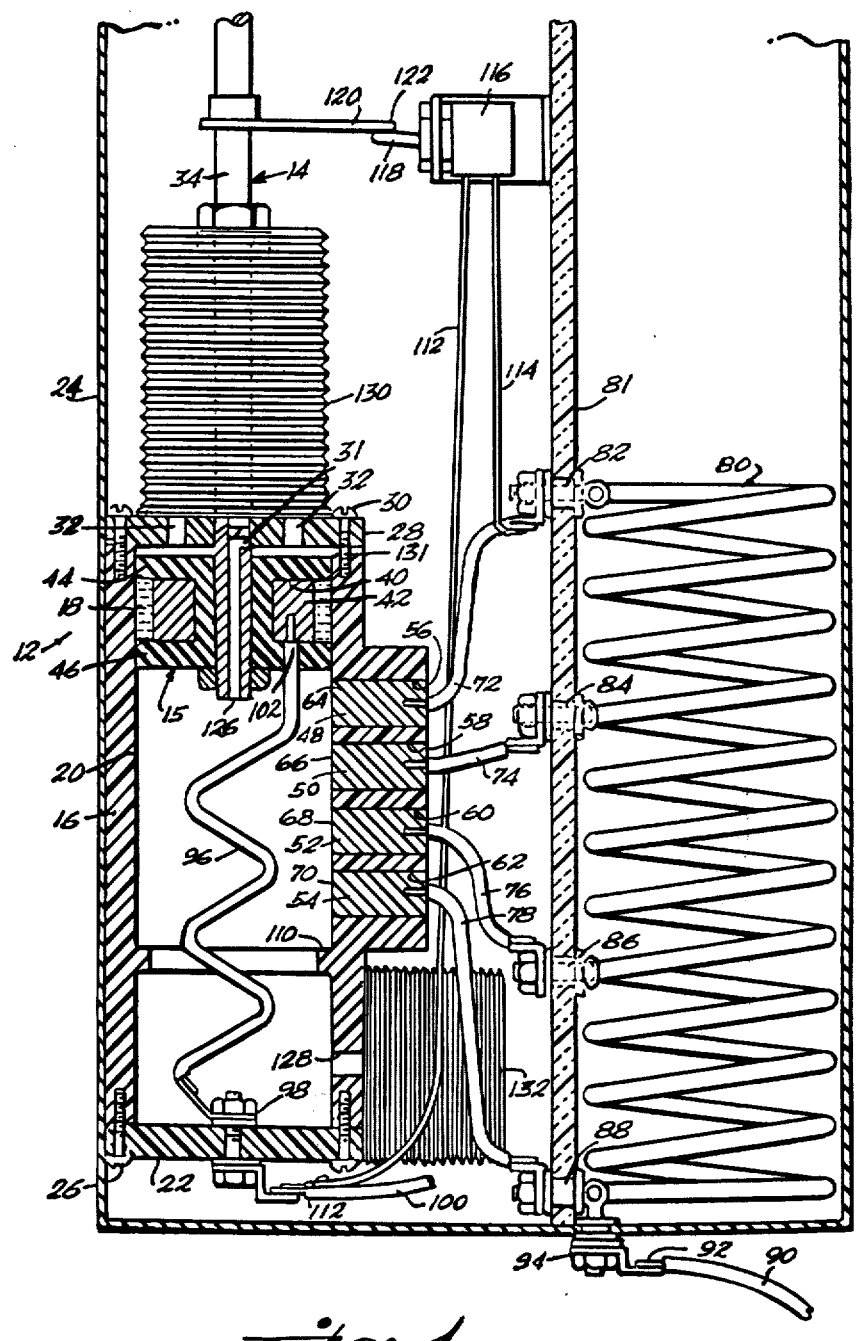
FIG. 1 is a vertical sectional view of a first embodiment of an electrical control unit incorporating certain of the concepts of the present invention.

Referring now to the drawings, FIG. 1 depicts the first embodiment of the electrical control unit which is generally indicated by the numeral 12. In this illustrated embodiment, control unit 12 comprises a piston, generally indicated by the numeral 14, with a head generally indicated by the numeral 15, reciprocally arranged in a cylinder 16 for reciprocable movement to control the magnitude of current flow in a circuit means from a power source. The piston surface may be regarded as a slide member. Generally, on movement of the piston, a captivated ring of flowable conductive material 18, carried in the piston head 15, is brought successively into electrical contact with electrical leads or segments axially arranged along the interior surface of the cylinder wall, or suitably configured slide surface companionate to the slide member surface. This permits current to flow through the circuit means in a quantity which is dependent upon the location of the ring carrying piston head relative to the electrical contacts in the cylinder, each of which is in series with a separate impedence means. In the following paragraphs, the structure of the first embodiment of the unit will be described, to be followed by a description of the electrical circuit; and thence, a description of the operation will be set forth.

Referring to the piston and cylinder assembly, it is seen that the interior of the cylinder 16 is of nonconductive, air impervious material 20, which in the preferred embodiment may be secured to the housing 24 by suitable means, such as an adhesive. The bottom 22 of the cylinder also is of similar nonconductive material, such as rubber, and is secured to the cylinder wall as at 26. The upper end of the cylinder is provided with a cap 28 secured thereto, as at 30, the cap having a central through hole 31 and passageway means 32, which are for a purpose which will be explained in connection with the piston rod to allow for displacement of fluid upon movement of the piston in the subsequent description of the operation.

Referring to the piston 14, it includes a rod 34 having one end at all times exterior of the cylinder and a head 15 connected to the interior rod end, with the intermediate rod portion of the rod slidably extending through the hole 31 in the cap 28 of the cylinder.

The piston head 15 is also of nonconductive material and snugly, but slidably, fits in the cross section of the cylindrical barrel. In the wall of the head 15, an annular recess 40 is provided, which in the preferred embodiment is an annular groove. Within this recess a movable electrical contact, now to be described is carried. In the preferred embodiment in the innermost portion of the recess 40, there is provided a plug or ring 42 which may be of carbon and which defines an outer or peripheral chamber between its outboard surface and the piston working surface which is filled with mercury or other suitable electrically conductive liquid 18.

In operation, when the piston is moved axially, the captivated mercury is swept between the captivating wiper segments 44 and 46 on opposite sides of the pool into and out of successive electrical connection with the leads or segments 48, 50, 52 and 54, which form part of the barrel surface and which are in axially spaced relation with respect to one another. A suitable construction provides through holes 56, 58, 60, and 62 in the cylinder wall in which electrically conductive plugs, 64, 66, 68 and 70, are securely seated; and into the exterior end of the plugs lead wires are connected, the same being designated by the numerals 72, 74, 76 and 78.

Each of these lead wires is connected to an impedence element, such as that indicated by the numeral 80. While separate impedence elements may be utilized, it is preferred to use a single resistance element in spiral form as indicated, suitably carried by a frame 81 connected to the housing 24 of the unit. The wires or leads are connected at axially spaced points along the resistance element, as at the connectors 82, 84, 86, and 88. The latter connector is connected to the impedence element at the point of least resistance to current flow from a source, not shown, but to which the input lead 90 is connected at one end, and, at the other end 92, to a suitable electrical connector 94, which is connected to the impedence element. The lead 72, on the other hand, is connected at the point of substantially maximum resistance of the impedence element to current flow.

Thus, it is seen, that as the piston travels downwardly in the cylinder, it will successively contact the several electrical segments in the cylinder wall and permit a current component to flow through the leads dependent upon the impedence to the flow. As the piston moves from top dead center, as shown, the current will increase inversely to the impedence in the circuit path dependent upon the particular position of the liquid conductive pool in the piston head.

The variable current flow will then be available to drive an electrical unit, the flow taking place through an extendible lead wire 96 extending from the piston head to a connector 98 in the cylinder wall, below the piston head travel and through the main electrical outlet line 100 to connect to a unit to be driven by the variable energy flow. The end 102 of the extendible conductor 96 is embedded or suitably connected to the plug 42 in the piston head 15.

Certain relative dimensions are of significance and these will now be referred to. It is seen that the axial dimension of the electrically conductive pool of liquid 18 is at least slightly greater than the axial dimension between the corresponding axial location of corresponding parts of the conductive plugs 64, 66, 68 and 70, in the cylinder wall, so that, when the pool is located, for instance, between two adjacent plugs, a component of current will be permitted to flow through the associated electrical lead of each plug as the piston moves until such time as it is substantially opposite a single plug. Additionally, in this embodiment the dimension of the pool is such that, when it is located such that its lateral centerline is colinear with the lateral centerline of a plug, current will flow through that plug only. It is thus seen that when movement takes place in downward travel, except upon the initiation of the movement, there will be a gradual diminishing of the current component through the plug which is being left and a gradually increasing current component flow through the plug which is being approached. Additionally, stop means are provided, designated by the numeral 110, which limit travel of the piston away from the top dead center position, and the stop means are arranged relative to the pool and the associated axial piston head dimension of the leading edge of the piston travel away from the top dead center such that current will always be permitted to flow through the plug of minimum impedence so long as the piston is at the bottom of the stroke.

It will be generally recognized that arcing is apt to occur between the electrically conductive pool swept along by the piston head as it first approaches and makes electrical contact with the plug adjacent top dead center. The attendant problems of arcing are well known in the art and it has been found that these problems are substantially overcome in the instant invention. The structure employed for overcoming the effects of this problem comprise a balance circuit now to be described. The circuit comprises a switch 116 in series with or intermediate (a) a conductive wire 112 connected at one end to the main electrical output of the unit, and (b) a conductive element 114 connected at one end to the connector or impedence element at the point of maximum resistance. By reason of this balance circuit, when the switch 116 is closed and the current flow is first initiated, it will be seen that there is a transfer of the potential at connector 82 through the lead wire 114, switch 116, when it is closed, and through the wire 112 and conductor 96 to the piston head 15 so that conductive material 18 and plug 64 are at the same potential at the time of engagement, which balances and overcomes the problems of arcing. The switch 116 is provided with a trigger 118 which cooperates with an arm 120 carried on the piston rod 14 at an axial location such that the distal end 122 of the arm will close the switch 116 upon initiation of movement of the piston head.

It is thus seen that a range of current flow may be selected by an operator by merely depressing the piston. It will be appreciated, however, that there will be a displacement of fluid in the cylinder, and to accommodate this, passageways are provided at the upper and lower end of the cylinder as at 126 and 128 each of which leads to an upper end and lower expandable portion 130 and 132, such as bellows, into which the displaced fluid is adapted to flow. In the FIG. 1 embodiment, an axial passageway is provided in the terminal end of the piston rod 14 which communicates through a space 131 at top dead center with the passageways 32 which lead into the bellows or expandable member 130 which is sealingly connected to the cap about the passageways 32, as is the bellows 132 with respect to the passageway 128 below the piston head travel.

In the preferred form of the FIG. 1 embodiment, the stop means 110 limiting the piston travel adjacent the lower portion of the cylinder may be frangible, so that an operator may, by applying pressure to the piston through an operator means, interrupt all current flow to the device being energized by the current source means.

While this invention has been described in reference to a piston head traveling with respect to the cylinder wall, it will be appreciated by those skilled in the art that any type of slide surface of nonconductive material may be provided in which there are separate spaced electrical contacts arranged at fixed locations on the slide surface and defining a slide path which comprises part of the smooth surface, so that a movable contact or slide member with a main nonconductive surface and an electrically conductive segment, or pool captivated for movement with the slide member, may be brought into successive engagement with the fixed electrical contacts so that electrical current flowing from the source means will be controlled by the location of the segment or pool. While in the preferred embodiment, a single impedence means is provided to which the electrical contacts are connected at predetermined points therealong, a plurality of separate current sources may be provided to deliver current to each of the contacts, such as from a bank of batteries connected in series, or from generator means, and with the lead wires from the contacts connecting to the posts of an appropriate battery of the bank.

The balance circuit is not required or may not be preferred where the voltage and current to the electrical lead adjacent the top dead center position is such that there are no objectionable arcing problems on initiation of contact by the pool or segment with that lead.

It will be seen that the portions of the periphery of the piston head on opposite sides of the pool serve as wiper means which captivate and move the mercury on movement of the piston; and to increase the wiper effect the portions on opposite sides of the pool may be provided with peripheral grooves to define what may be described as somewhat flexible or displaceable flap-type wiper means as the nonconductive material of the head wears. Additionally, adjustment means may be provided to expand the piston head diameter about the pool, such as V rings, or other similar devices. It has been found that because mercury is quite flowable, it may be thickened by a powdered metallic conductive material, such as a silver powder, which is thoroughly mixed with the mercury so as to provide an amalgam, which is perhaps not technically a liquid but for the purposes of this description is encompassed in the terms pool or liquid. The amount of powder to be mixed with the mercury may be selected to provide the desired flowability and consistency of the amalgam. While the contacts along the slide surface may be copper, or brass, or other suitable material, it is also practical to provide a coating of mercury, as by an electroplating process, to the exposed copper surface of the contact, or whatever material that conductive surface may be, so that the electrical contact at the surface of engagement between the slide surface and slide member is mercury to mercury.

Figure 2:
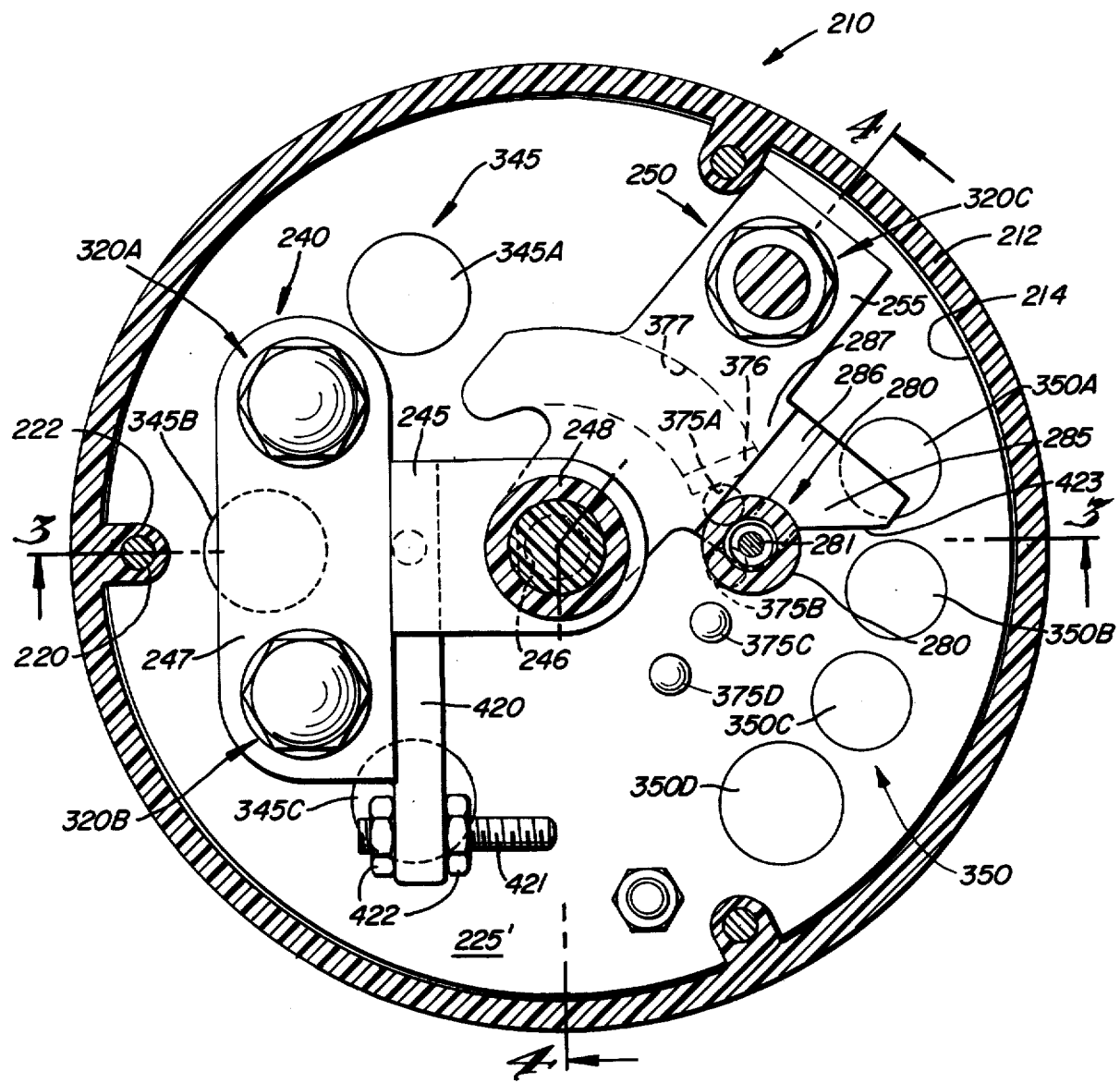
FIG. 2 is a horizontal sectional view of a second embodiment of an electrical control unit incorporating certain of the concepts of the present invention, taken substantially along the line 2—2 of FIG. 3.
Figure 3:
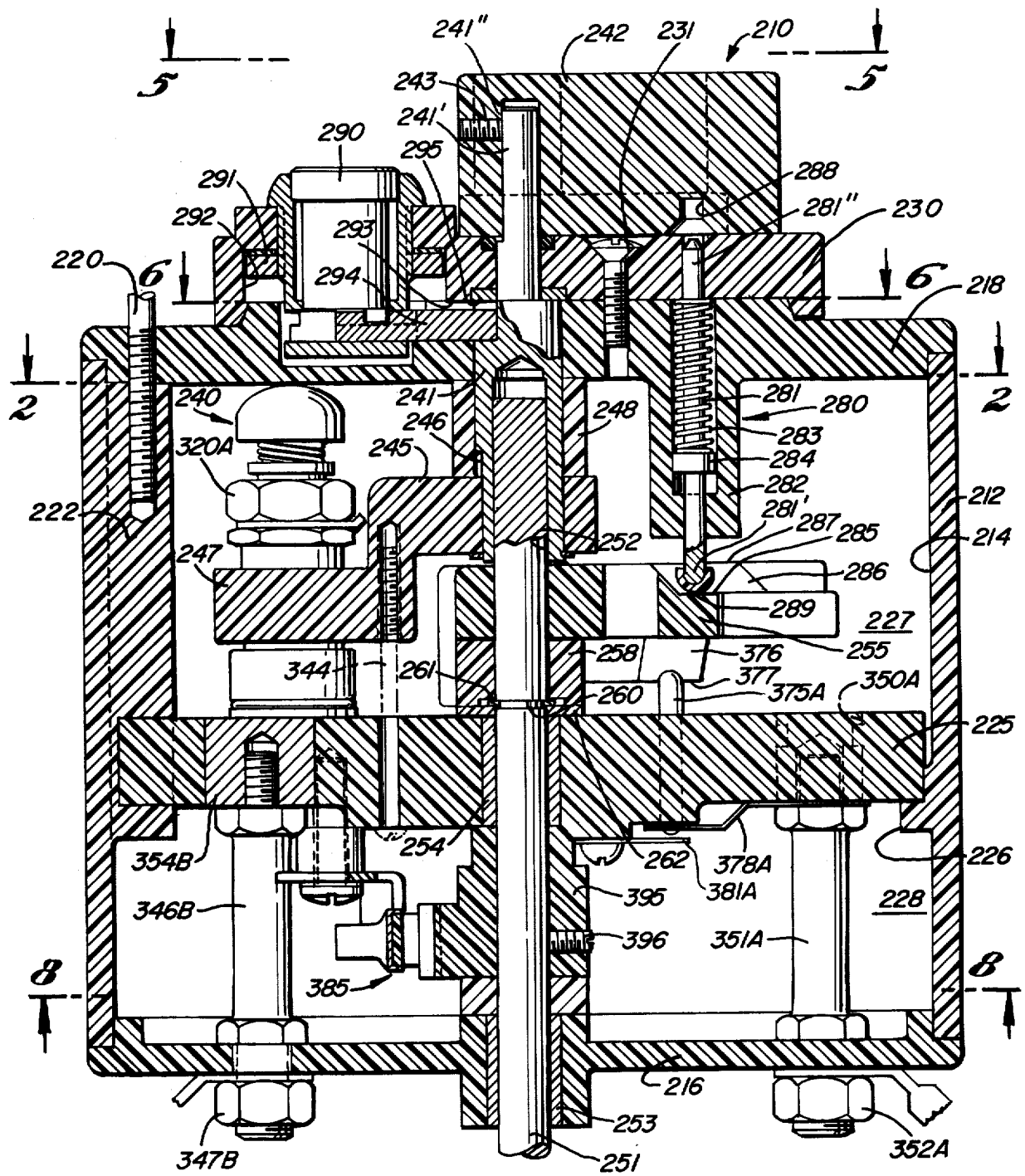
FIG. 3 is a vertical sectional view taken substantially along the line 3—3 of FIG. 2.

With reference to the second embodiment of the invention depicts in FIGS. 2–19 of the drawings, in which like reference characters designate like or corresponding parts throughout the various views, the electrical control unit, generally indicated by the numeral 210 includes a cylindrical housing 212, defining an interior annular chamber 214 closed by a bottom plate 216 and a top plate 218. In an operational environment the unit may be mounted with the axis through the housing in a horizontal attitude with the bottom and top plates 216 and 218 constituting back and front plates, or any other attitude without affecting the performance of control unit 210; but, the description refers to the positions illustrated in the drawings for purposes of convenience. The end closures 216 and 218 are attached to and sealed, as necessary to withstand environmental conditions to be encountered, relative to housing 212 by an adhesive or sonic welding for a relatively tamper proof unit or by removable fasteners and suitable seals for a unit that is interiorly more accessible. As seen in FIGS. 2 and 3, one or more mounting studs 220 may be threadably anchored in radially reinforced portions 222 of housing 212, extend through top plate 218, and project a sufficient extent to pass through a mounting plate, such as the dashboard of a vehicle on which a driven unit powered by control unit 210 is mounted.

Figure 4:
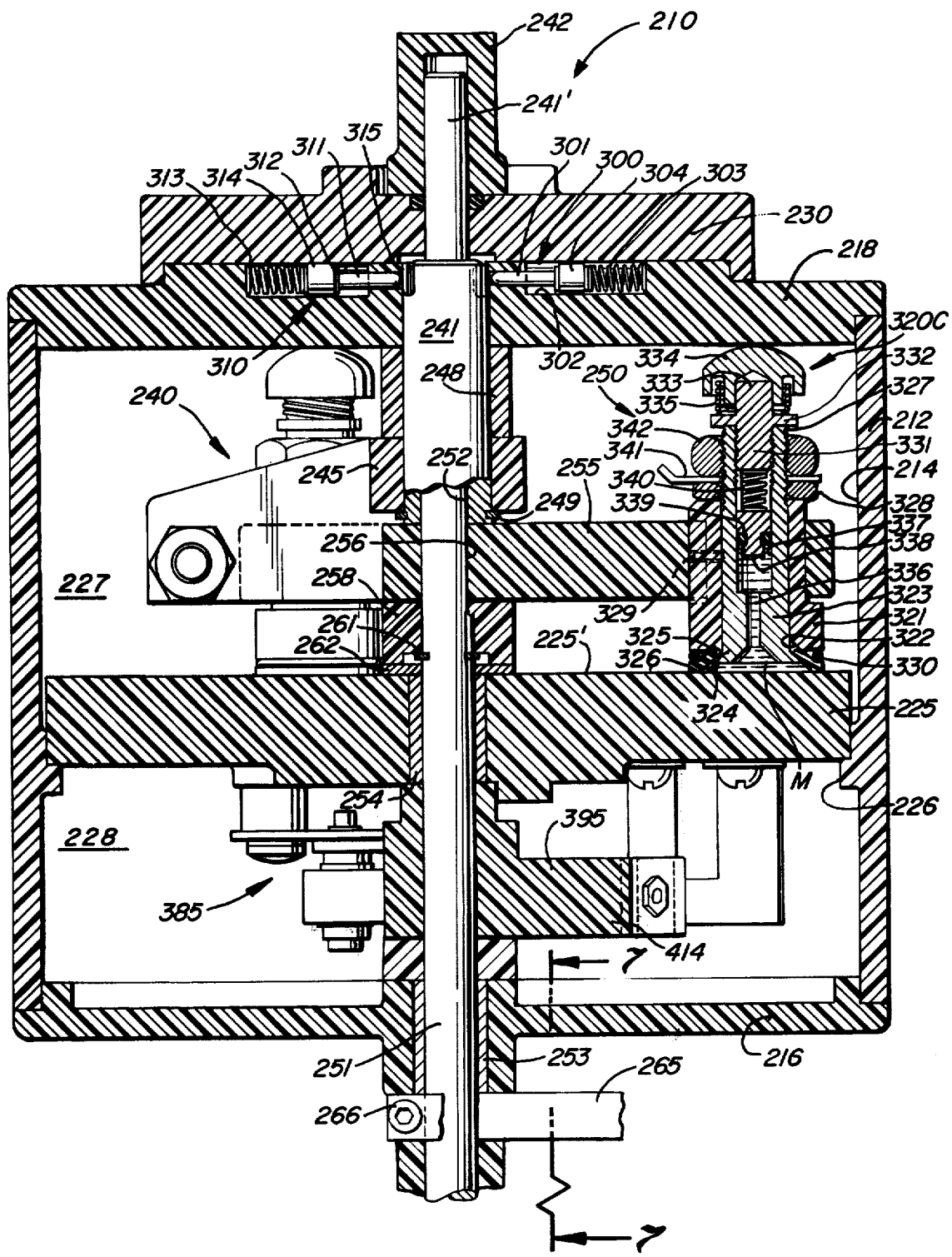
FIG. 4 is a vertical sectional view taken substantially along the line 4—4 of FIG. 2.
Figure 5:
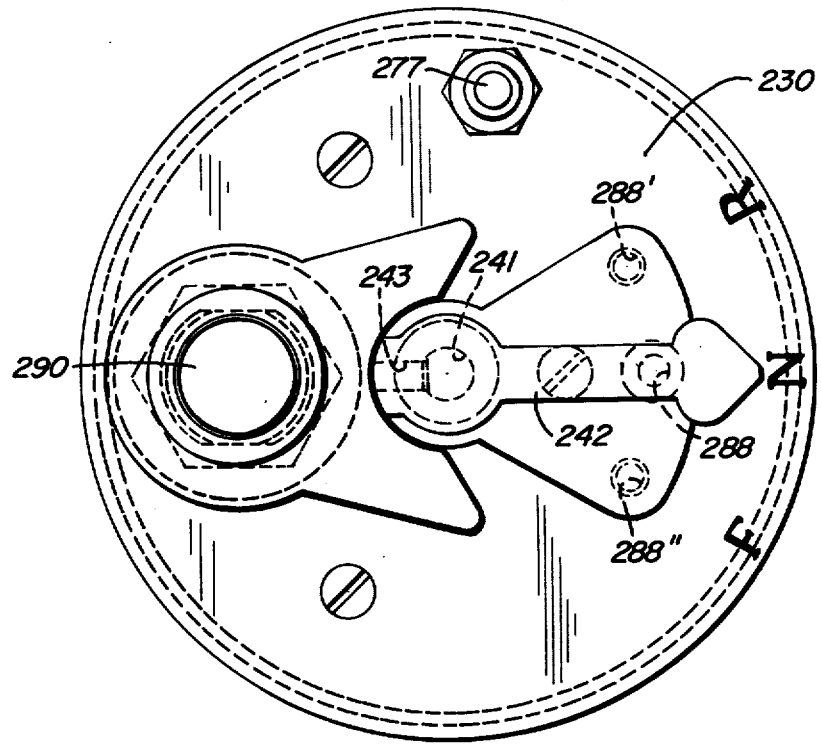
FIG. 5 is a top plan view of the central portion of FIG. 3 viewed substantially as indicated by the line 5—5 of FIG. 3.

A septum 225, positioned against a shoulder, defined by an interior annular flange 226 extending inwardly from the housing 212 divides the interior chamber 214 into upper and lower chambers 227 and 228, respectively, as seen in FIGS. 3 and 4. Referring to FIGS. 3, 4, and 5, a lock plate 230 may be affixed by fasteners, such as screws 231, exteriorly of the upper end plate 218. The above description sets forth the primary framework or structural members in which the various operative components are housed. It should be noted that all of the above described elements may be formed of an electrical insulating material such as any of a number of suitable plastics.

Turning now to the operating components as best seen in FIGS. 2–4, there is a direction control assembly, generally indicated by the numeral 240, housing a direction control shaft 241 axially disposed in the upper portion of the upper chamber 227 of housing 212. Extending through the top plate 218 is a reduced diameter portion 241' of shaft 241 which also extends through the lock plate 230 for rotation with a manually operated direction control knob 242 (see also FIG. 5) located exteriorly of the lock plate 230. The knob 242 may be attached to a flat portion 241'' of shaft 241 by a set screw 243 (FIGS. 3 and 5) or other comparable means for attaching a member to a shaft to eliminate relative rotation therebetween and to secure knob 242 axially of shaft 241. A direction control arm 245 is rotatably carried with the upper chamber 227 by the direction control shaft 241 which may be provided with a flat 246 (FIG. 3) to key direction control arm 245 thereto. As shown, the direction control arm 245 includes a stepped yoke 247 (FIG. 3) which is suitably bored to carry a pair of pressure contact assemblies (FIG. 2), generally indicated by the numerals 320A and 320B, the structure and operation of which is hereinafter detailed. Direction control arm 245 is maintained in a fixed position axially of housing 212 by a spacer sleeve 248 disposed between it and top plate 218 and a retainer ring 249 positioned on shaft 241.

Operatively positioned in upper chamber 227 of housing 212 with direction control assembly 240 is a throttle control assembly, generally indicated by the numeral 250, having a throttle shaft 251 extending through lower end plate 216, lower chamber 228, and septum 225 into telescopic engagement with an axial bore 252 in the shaft 241. The bottom plate 216 and septum 225 may advantageously be provided with bearing members 253 and 254, respectively, to receive the shaft 251. Shaft 251 freely rotates in bore 252 of shaft 241 for independent rotation of the shafts 241, 251, the telescoping arrangement providing alignment for shaft 251.

In a manner similar to direction control arm 245, a throttle control arm 255 is similarly, rotatably carried on a flat portion 256 on throttle shaft 251, in the upper chamber 227 of housing 212. As shown, the throttle control arm 255 is suitably bored to carry a pressure contact assembly 230C (FIGS. 2 and 4), which may conveniently be identical to those carried by direction control arm 245. Throttle control arm 255 is maintained in a fixed position axially of housing 212 by the lower extremity of direction control shaft 241 on one side and by a spacer sleeve 258 on the other side. The throttle control shaft 251 may have a groove 260 (FIG. 3) carrying a retaining ring 261 interposed between spacer sleeve 258 and a bearing washer 262 which seats against septum 225 to maintain it axially positioned within housing 212. Rotation of throttle control shaft 251 may be effected by suitable linkage from a vehicle foot pedal or otherwise as by a throttle control arm 265 (FIGS. 4 and 7) which is nonrotatably attached to the shaft 251 as by a screw member 266.

Figure 7:
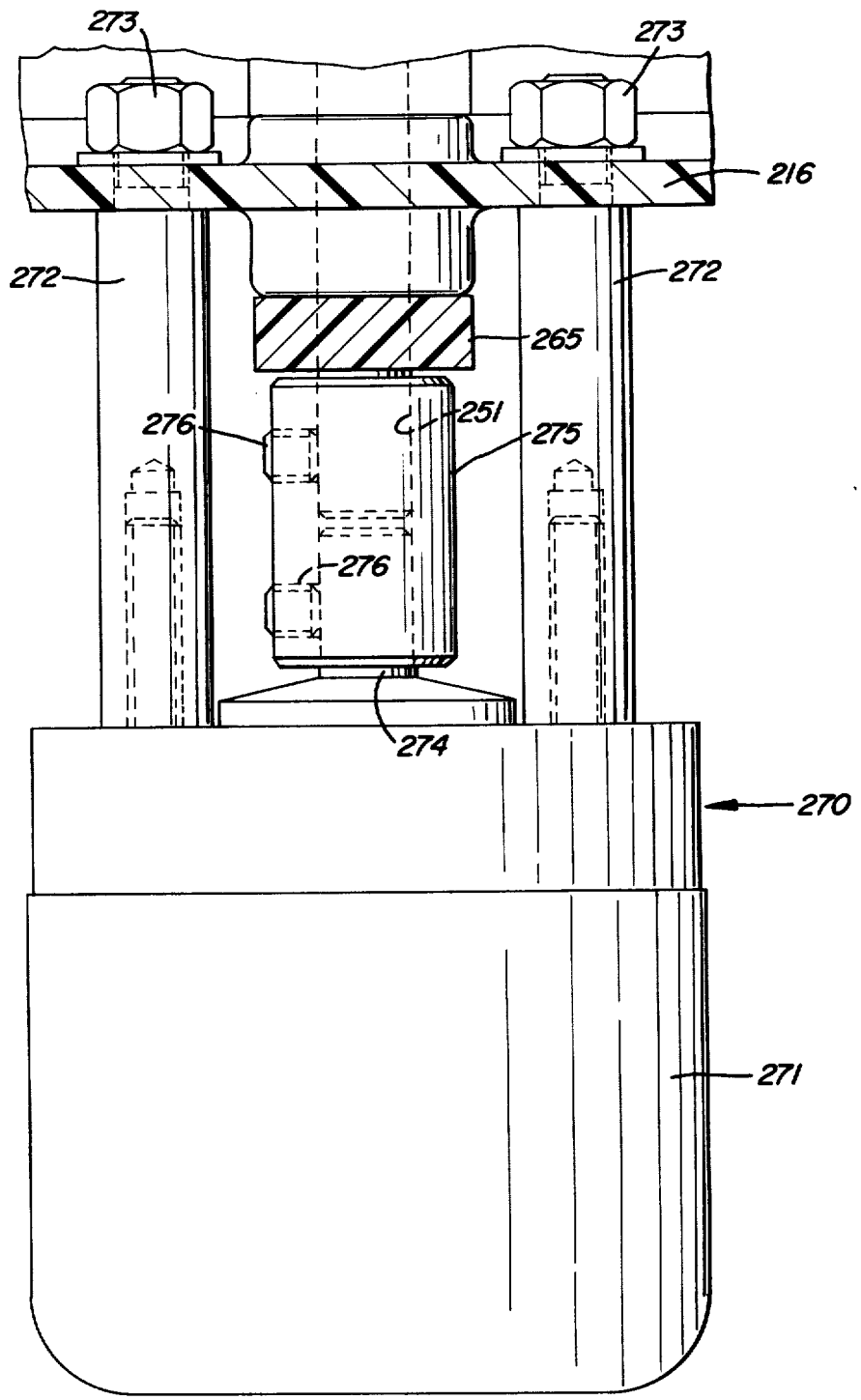
FIG. 7 is a vertical sectional view taken substantially along the line 7—7 of FIG. 4.

In applications where it might be necessary or desirable for safety or other considerations, a throttle control override, generally indicated by the numeral 270 in FIG. 7, may be provided. As shown, the throttle control override 270 consists of a solenoid 271 spaced from and attached to bottom plate 216 of housing 212 as by studs 272 and nuts 273. Solenoid 271 has a shaft 274 which is coupled to throttle control shaft 251 as by a collar 275 and set screws 276. Normally, the solenoid shaft 274 idles freely with its position dictated by the throttle control arm 265; however, upon actuation of solenoid 271 as by a push button 277, which may conveniently be located on lock plate 230 (FIG. 5), as in the event of failure of control arm 265, the throttle shaft 251 is rotated to an "off" or other predetermined position.

Referring to the direction control knob 242, as viewed in FIG. 5 in the N or neutral position, clockwise rotation thereof to the F position turns the direction control shaft 241 and arm 245 to condition control unit 210 to power a driven unit for forward movement in a manner to be subsequently described. Counterclockwise rotation of knob 242 to the R position rotates the direction control shaft 241 and arm 245 in a like direction to condition control unit 210 to power a driven unit for reverse movement.

Referring particularly to FIGS. 2, 3, and 5 the direction control assembly 240 and the throttle control assembly 250 are operatively interrelated by a direction control interlock, generally indicated by the numeral 280, which has a lock pin 281 slidably journaled in a cylindrical, inward extension 282 of the end closure plate 218. When the control knob 242 is in the neutral position illustrated in FIG. 5, a spring 283, circumposed about the lock pin 281 between the lock plate 230 and an enlarged portion 284 of the lock pin 281, biases the lower end 281' thereof against a low portion 285 of the throttle arm 255. When the throttle shaft and arm 251 and 255 are actuated by clockwise rotation from the "off" position of FIG. 2 to introduce an electrical load, the inclined cam portion 286 of the throttle arm 255 engages the lower pin end 281' moving it upwardly onto top surface 287 of arm 255 thereby forcing the upper pin end 281' into one of bores 288, 288' or 288" (FIG. 5) when the control knob 242 is in the neutral, forward, or reverse positions, respectively. Therefore, the direction control knob 242 cannot be rotated from any position, forward, neutral or reverse, in which it reposes except when the throttle control arm 255 is in the "off" position, i.e., with no electrical power being transmitted to the driven unit. If desired an antifriction cap 289, or alternatively a roller, may be positioned on lower pin end 281' to minimize lateral forces caused by movement of throttle control arm 255 which might otherwise tend to cause the pin 281 to bind, and thereby restrict its vertical movement.

Figure 6:
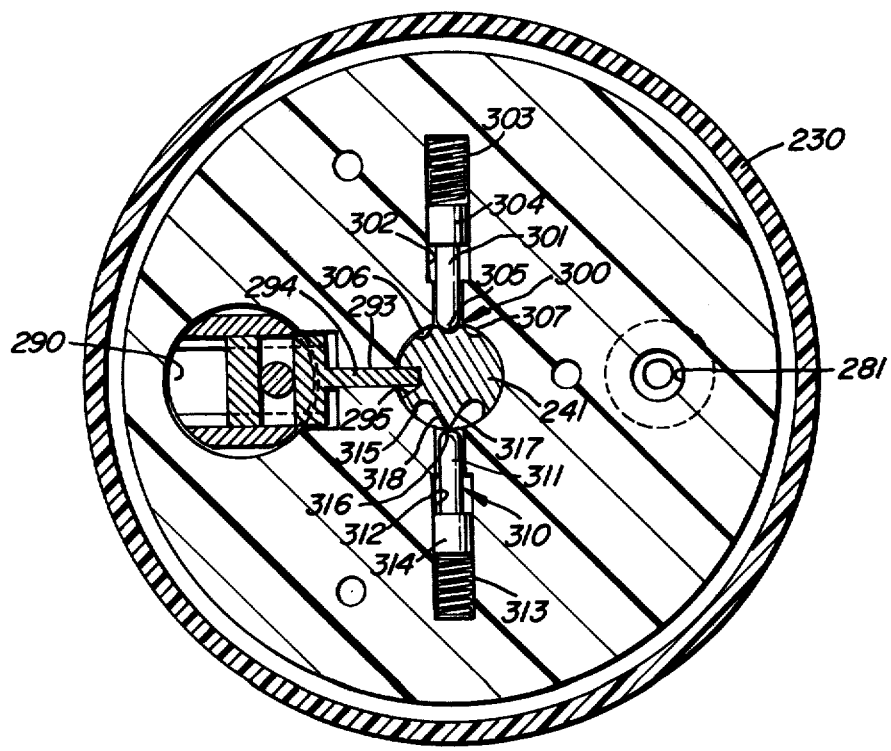
FIG. 6 is a horizontal sectional view taken substantially along the line 6—6 of FIG. 3.

Referring now to FIGS. 3, 5 and 6 a key or otherwise actuated security lock 290 is fixed in a bore in the lock plate 230 by a nut 291 threaded thereon within a cavity 292 in said lock plate 230. Extending through a slideway 293 in the upper end plate 218 is a lock bar 294, actuated by lock 290, engageable in a slot 295 (FIGS. 3 and 6) in the direction control shaft 241 when the knob 242 is in the neutral position.

Once the security lock 290 is released and assuming the throttle control arm 255 is in the "off" position of FIG. 2, the direction control knob 242 may be rotated to select either the forward or reverse positions. Preferably, the direction control shaft 241 has means providing locking alignment at the forward, neutral and reverse positions and means urging the assumption of either the forward or reverse position once the control shaft 241 is turned angularly in either direction from the neutral position. In this respect a position alignment detent, generally indicated by the numeral 300, has a pin 301 (FIGS. 4 and 6) which is mounted in a slot 302 in upper end plate 218. As seen, the pin 301 is biased radially inwardly toward direction control shaft 241, as by a spring 303 operating on piston member 304 attached to pin 301 for seating in a slot 305 in the neutral position, in a slot 306 when the direction control knob 242 is moved to the forward position and in a slot 307 in the reverse direction (FIG. 6). The position alignment detent 300 as constituted provides alignment for other components and prevents accidental movement of the direction control knob 242 and components carried thereby during operation, since a predetermined substantial amount of energy is required to effect movement of pin 301 to displace it from any one of the slots 305, 306, 307.

In order to insure full rotational travel of control shaft 241 from the neutral position where pin 301 is in slot 306 to either of slots 305, 307, shaft 241 may be provided with a rotation biasing assembly, generally indicated by the numeral 310. As shown in FIGS. 4 and 6, rotation biasing assembly 310 has a rod 311 which is located in a slot 312 in upper end plate 218 of housing 212. The rod 311 is biased radially toward shaft 241 by a compression spring 313 which forceably engages a piston member 314 attached to rod 311 and engages a cam slot 315 in shaft 241. The cam slot 315 has a central high portion 316, which corresponds to the neutral position of control knob 242, that spaces and joins side lobes 317 and 318 which are engaged during rotation of shaft 241 to the forward and reverse positions, respectively. The surfaces of side lobes 317, 318 of cam slot 315 are so configured that the rod 311, as urged by spring 313, tends to maintain shaft 241 in rotation once off the high portion 316 constituting the neutral position until pin 301 locks in either of slots 305, 307 signaling attainment of full on or exact coincidence with either the forward or reverse positions.

As previously indicated, pressure contact assemblies, generally indicated by numerals 320A, 320B, and 320C, which may be identical, are carried by the direction control assembly 240 and the throttle control assembly 250. As shown in FIGS. 2-4, the direction control arm 245 carries in the yoke 247 a pair of pressure contact assemblies designated 320A and 320B, and the throttle control arm 255 carries a single pressure contact assembly designated by the numeral 320C. For purposes of explanation the structure and operation of pressure contact assembly 320C is hereafter described, it being understood that assemblies 320A and 320B may be of identical configuration (not shown).

As shown in FIG. 4, the pressure contact assembly 320C has a generally tubular housing 321 positioned in a bore in the throttle control arm 255 and preferably oriented such that it is substantially perpendicular to both the under surface of top plate 218 and the upper surface of septum 225 over at least the extent of operative relation therewith. The lower extremity of housing 321 has a beveled surface 322 directed inwardly and upwardly. A lug sleeve 323 matingly engages the interior bore of housing 321 and has its lower extremity 324 flared outwardly to form, with beveled surface 322 of housing 321, an annular channel adapted to receive a contact wiper 325 which is generally in the shape of a frustum of a thin walled cone. The lower extremity of contact wiper 325 may have an annular flange 326 formed therein providing an enlarged area for engaging a slide surface 225' formed on the top of septum 225. The upper portion of sleeve 323 has threads 327 to receive a lug nut 328 which engages the upper end of housing 321 to move sleeve 323 vertically relative thereto to clampingly hold contact wiper 325 between beveled surface 322 of housing 321 and flared extremity 324 of lug sleeve 323. Housing 321 may be provided with a set screw 329 extending therethrough into contact with lug sleeve 323 to prevent relative rotation therebetween, thereby insuring the desired vertical movement upon rotation of lug nut 328. A pressure ring 330 may be interposed between the lower extremity of housing 321 and annular flange 326 to maintain contact wiper 325 firmly but resiliently biased against the slide surface 225.

A plug 331 threaded into the upper end of lug sleeve 323 has a flange 332 which is brought into engagement with the upper extremity of lug sleeve 323. Extending above flange 332 of plug 331 is a cylindrical rod 333 which serves as a guide for a cap 334 which is bored to receive rod 333. Cap 334 is preferably of a material having a low coefficient of sliding friction, or, if desired a roller could be substituted therefor. A spring 335 interposed between cap 334 and flange 332 of plug 331 maintains housing 321 and lug sleeve 323 resiliently biased against contact wiper 325 to effect pressure engagement with slide surface 225'. This maintains a pool of mercury M, or other conductive material, such as an element having comparable physical and electrical characteristics or an amalgam of another electrically conductive element as discussed in conjunction with the first embodiment of the invention, encapsulated within the contact wiper 325 during its movement across side slide surface 225' as controlled by throttle control arm 255. Although the lower portion of mercury pool M is a generally solid conical configuration by virtue of the shape of wiper 325 and lug sleeve 323 other geometric configurations might be employed which meet the requirements hereinbefore and hereinafter specified. The lug sleeve 323 is bored upwardly of flared extremity 324 to form a relatively narrow channel 336 which communicates with an enlarged cylinder portion 337 forming a reservoir for mercury M. A piston 338 having a seal 339 retains the mercury M within the reservoir. In order to compensate for expansion of the mercury M caused by temperature variations due either to ambient conditions or electrical loading, the piston 338 is engaged by a spring member 340 which seats against the plug 331 in lug sleeve 323. An electrical contact 341 may be conveniently positioned on sleeve 323 and secured between the lug nut 328 and a retaining nut 342. A cap screw 344 (see FIG. 3) or other temporary retainer may be employed to maintain the relative position of arms 245 and 255 with respect to the septum 225 during assembly or disassembly of the pressure contact assemblies 320A, 320B, and 320C before attachment of top plate 218.

The pressure contact assemblies 320A, 320B and 320C selectively engage and disengage by relative movement with respect to a plurality of contacts which provide direction control selection and throttle control setting. As best seen in FIG. 2, slide surface 225' has a grouping of direction control contacts, generally indicated by the numeral 345 consisting of three contacts 345A, 345B, and 345C centered on a radius about the axis of direction control shaft 241 which passes through the center of pressure contact assemblies 320A and 320B and spaced circumferentially a sufficient distance such that the pressure contact assemblies 320A and 320B may be positioned therebetween without being in contact therewith, as depicted as the neutral position of FIGS. 2 and 5 of the drawings. In the forward position of direction control knob 242 contact assembly 320A engages contact 345A and assembly 320B engages contact 345B. In the reverse position of direction control knob 242 contact assembly 320A engages contact 345B and assembly 320B engages contact 345C. The contacts 345A, 345B, and 345C are preferably sized substantially equivalent to the size of the mercury pools carried in the contact assemblies 320A, 320B.

Slide surface 225' also has a grouping of discrete throttle control contacts, generally indicated by the numeral 350, which is preferably made up of a plurality of contacts 350A, 350B, and 350C, the number being determined by the current range being serviced and the electrical characteristics of the components, which may be of smaller size than the mercury pool carried in the pressure contact assembly 320C progressively thereacross. The grouping of contacts 350 may include a larger contact 350D sized substantially equivalent to the mercury pool carried in the contact assembly 320C. The contacts 350 are centered on a radius about throttle control shaft 251 which passes through the center of pressure contact assembly 320C with the larger contact 350D being at the circumferential extremity constituting the full power setting at the opposite end from the "off" setting at which contact assembly 320C is depicted in FIG. 2. The spacing, relative size, and other parameters of contacts 350 and pressure contact 320C are hereinafter discussed in conjunction with explanation of the operation.

Figure 8:
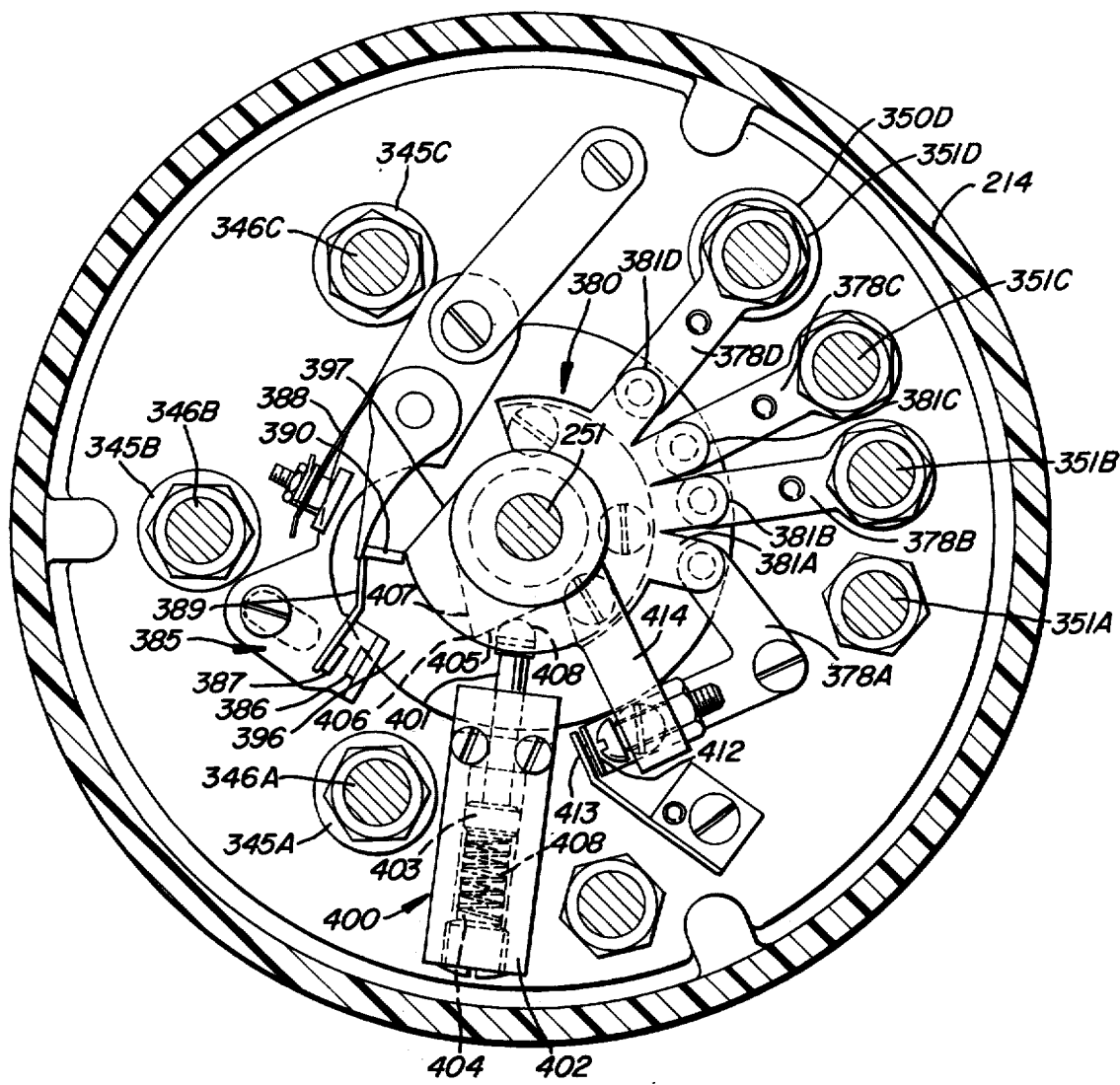
FIG. 8 is a horizontal sectional view taken substantially along the line 8—8 of FIG. 3.

It has been found that the slide surface 225' must be nonconductive and is advantageously a smooth, moisture resistant surface such as that which might be formed from a resin with low hygroscopic tendencies and a similarly selected filler also having good insulation qualities. In this respect, a glass filled phenolic has demonstrated consistently good operating characteristics in a variety of environments with the prospects of long service life. The contacts 345 and 350 are preferably formed with a top surface of nickel or chrome plating which is coplanar with and forms a smooth transition between components of the slide surface 225'. The nickel or chrome surface plating on the contacts resists arcing and possible amalgamation of a layer of mercury thereon which would reduce the effectiveness of the contact and could cause lifting of a pressure contact assembly 320A, 320B or 320C, thereby interfering with free movement of the contact assemblies or even permitting escape of mercury therefrom such as to cause serious operating difficulties. A wiper 325 of pressure contact assembly 320A, 320B ro 320C formed wholly of or having a contact surface of one of the self-lubricating polymeric materials provides compatability with a slide surface 225' so constituted. It has been found that a wiper 325 formed of or having a coating of a Teflon having good cold flow resistance characteristics is particularly appropriate for this application. As seen in FIGS. 3 and 8, the contacts 345 may have corresponding stubs 346A, 346B, and 346C threadably attached thereto and extending through bottom plate 216 for convenient external attachment of suitable electrical leads as by the nut, 347B. Contacts 350 may be similarly fitted with studs 351A, 351B, 351C and 351D and mating nuts as exemplified lug nut 352A.

Figure 9:
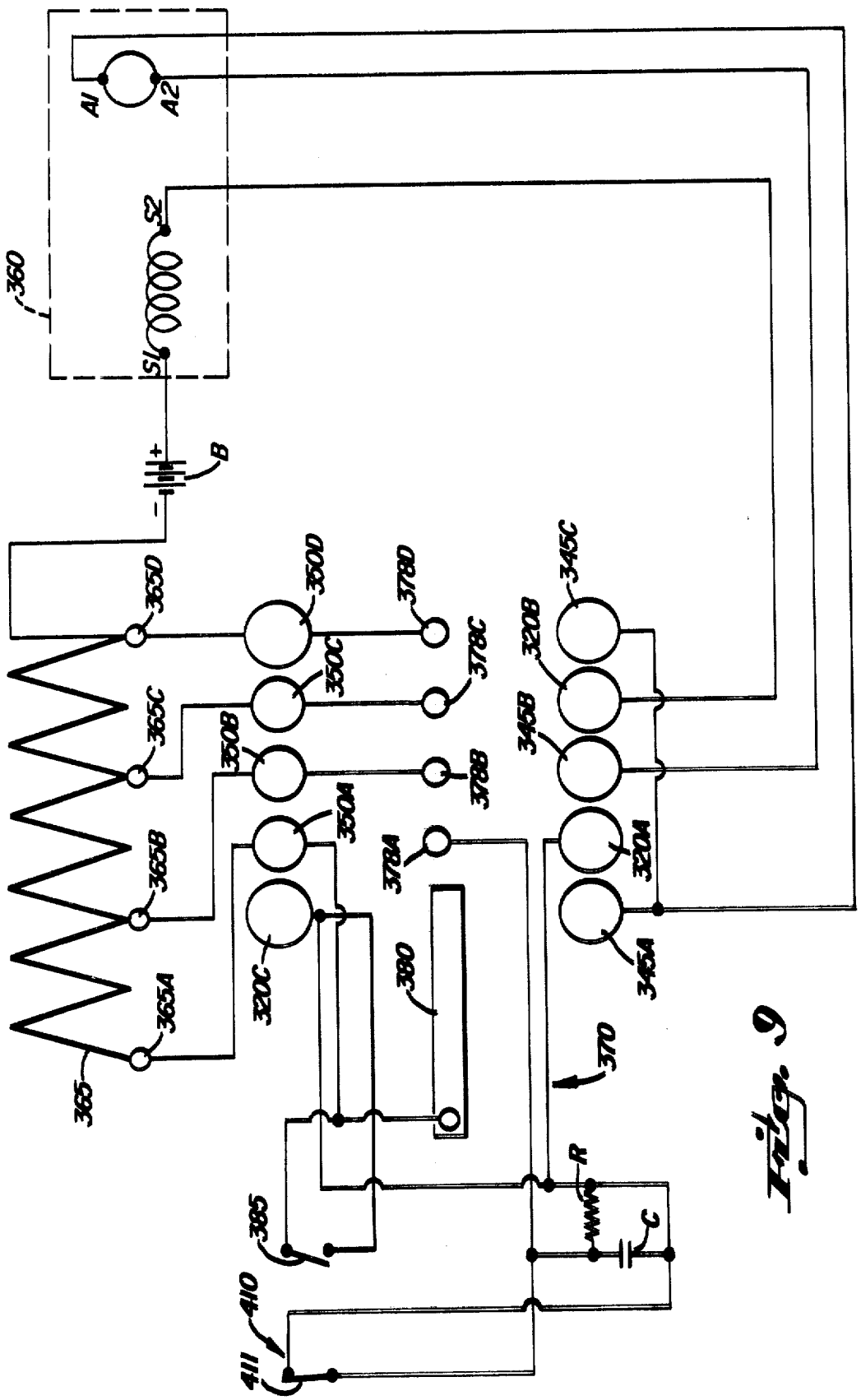
FIG. 9 is a schematic diagram of the electrical components and wiring of the electrical control unit of the present invention, as depicted in FIGS. 2–8.

An exemplary schematic wiring arrangement for the control unit 210 of the second embodiment of the invention is depicted in FIG. 9 and described hereinafter in conjunction with an exemplary operating sequence. For purposes of explanation the components of control unit 210 are depicted in conjunction with a driven unit having conventional direct current motor 360 having field winding terminals S1 and S2 and armature terminals A1 and A2. A power supply depicted as battery unit B may be constituted of a single battery or a bank of batteries is shown in series connection with the motor 360. An impedence device 365 constituting a resistance element having a plurality of terminals 365A, 365B, 365C and 365D is connected to battery unit B on the side opposite motor 360 and provides a selective resistance component from a maximum at terminal 365A to a least resistance component at terminal 365D. As seen, the terminals 365A, 365B, 365C and 365D are connected to contacts 350A, 350B, 350C, and 350D, respectively, of control unit 210.

Referring particularly to FIGS. 3, 8 and 9, a typical operating sequence employing the control unit 210 in the arrangement depicted could proceed as hereinafter set forth. Initially, from a secured nonoperative status, the lock 290 would be actuated to release lock bar 294 from engagement in slot 295 of direction control shaft 241. The direction control knob 242 may then be rotated from the neutral position depicted in FIG. 5 to either of the forward or reverse positions as previously described. The selection of the forward position such as to bring pressure contact assembly 320A into engagement with contact 345A and assembly 320B with contact 345B connects field winding terminal S2 of motor 360 to armature terminal A2. A reversal of polarity, such that field winding terminal S2 of motor 360 is connected to armature terminal A1 producing reversed rotation of motor 360, is effected when contact assembly 320A engages contact 345B and assembly 320B engages contact 320C (FIG. 9). Rotation biasing assembly 310 and position alignment detent 300 assist rotation of the direction control shaft 241 and provide locking, respectively, with the contacts positively aligned in either the forward or reverse position as detailed hereinabove.

Since the control unit 210 is of such a design that it can be constructed to handle high power loading, it may be desirable to provide balancing circuitry, generally indicated by the numeral 370 in FIG. 9, for purposes of eliminating or at least minimizing arcing which might accompany travel of the pressure contact assembly 320C of the throttle control assembly 250 in making and breaking contacts 350. In general, the balancing circuitry 370 conditions the contacts 350 by means of sequenced interconnections to substantially the potential of pressure contact assembly 320C at the time of engagement or disengagement. As seen in FIGS. 2, 3, and 8, the commencement of rotation of throttle control arm 255 (clockwise from the "off" position of FIG. 2) sequentially depresses contact pins 375A, 375B, 375C and 375D due to their engagement with an inclined cam ramp 376 and projecting cam surface 377 on the underside of control arm 255. As seen in FIGS. 3 and 8, depression of pins 375 downwardly moves spring contacts 378A, 378B, 378C and 378D into engagement with a collector bar, generally indicated by the numeral 380, which may conveniently have a plurality of tabs 381A, 381B, 381C and 381D for this purpose (FIG. 8).

The depression of pin 375A into contact with collector 380 upon initial incremental rotation of throttle control arm 255 transfers the voltage or potential at resistance terminal 365A to contact 350A, collector 380, and spring contact 378A to one side of a capacitor C which is thus charged (FIG. 9). A resistor connected in parallel maintains the capacitor C stabilized by bleeding off any overcharge.

A further incremental rotation of throttle control arm 255 actuates a switch, generally indicated by the numeral 385, which energizes other portions of balancing circuitry 370 for final conditioning prior to engagement of the pressure contact assembly 320C and contact 350A and for instituting current flow to the motor 360. As seen particularly in FIGS. 3, 4, and 8, the switch 385 consists of breaker point contacts 386 and 387 which are continually biased toward engagement by a spring 388. As shown, an arm 389 on which movable contact 388 is carried has a projecting lug 390 which rides on a control cam 395. As best seen in FIG. 3, the control cam 395 may be situated on throttle control shaft 251 and selectively positioned for rotation with the shaft by a set screw 396 or other retainer. When throttle control arm 255 is in the "off" position and during the first increment of rotation the constant radius surface of cam 395 displaces lug 390 outwardly such that contacts 386 and 387 are out of engagement.

At this point in the sequence, lug 390 rides down a radially inclined surface 397 of cam 395 to an extent that contacts 386 and 387 engage. As seen in FIG. 9, the closure of switch 385 permits transfer of the potential at resistance terminal 365A to the pressure contact assembly 320C to contact 350A and switch contacts 386, 387. A further branch of this circuit, depicted as a connection just below contact assembly 320C, impresses this voltage on the other side of capacitor C from its connection with collector 380, thereby triggering discharge of the capacitor C through pressure contact assembly 320A to the armature of motor 360.

Also, this further incremental rotation of throttle control arm 255, preferably substantially contemporaneously with the depression of pin 375A, actuates the direction control interlock 280 described above. The direction control assembly 240 is thus locked into position until the throttle control arm 255 is returned to this position on the way to the "off" position.

Virtually simultaneously with the actuation of switch 385, the rotation of throttle control arm 255 brings the pressure contact assembly 320C into engagement with the contact 350A. This close sequential operation is significant to the protection of switch 385 which normally would not be designed to assume the heavy current loading which may be involved over any significant time period. Once the contact assembly 320C engages contact 350A, the current load is routed via this path through pressure contact assembly 320A to the armature of motor 360. This prompt transfer of the current loading from the switch 385 may be assured by employing a relatively high-resistance material for breaker point contacts 386, 387, by maintaining a relatively small contact area therebetween, and by employing relatively small diameter wire in comparison to comparable components of the current path through contact 350A and contact assembly 320C.

There are numerous factors which contribute to the nonarcing engagement achieved between contact assembly 320C and contact 350A. Initially, the mercury pool M in contact assembly 320C is brought to essentially the same potential as contact 350A by closure of switch 385 prior to engagement. Also, switch 385 has instituted momentary current flow to the motor 360 to supply a portion of the initial heavy drain upon starting. Further, the capacitor C is available to absorb any spike which might be produced at the time of contact to minimize the significance thereof. The constitution and configuration of contact assembly 320C and contact 350A are also deemed material to achieving a nonarcing engagement. First, with the lower portion of mercury pool M being circular and contact 350A being circular, the initial contact is essentially a minimal point contact at a tangent to each of the circular configurations. It should be appreciated that other geometric configurations of either or both of the contact members or an extension tapering to a point on one or both members could be employed to achieve a comparable result. Further the conical taper of mercury pool M presents a limited feather edge at the time of contact which increases in vertical extent progressively as mercury pool M is moved toward axial coincidence with contact 350A. Finally, the constitution of pressure contact assembly 320C with the pool of mercury M constitutes a contact material which has lower conductivity in comparison with many metals commonly employed to conduct electricity such as copper, for instance.

In order to insure continued movement of pressure contact assembly 320C from the closure of switch 385 until a substantial surface area of contact 350A is engaged, a rotation biasing drive, generally indicated by the numeral 400, is provided. As shown, the rotation biasing drive 400 has a drive piston 401 which is biased outwardly of a housing 402 which is bored to receive a piston member 403 attached to piston rod 401 and biased radially toward the throttle control shaft 251 by spring 404, as best seen in FIG. 8. Rod 401 engages a surface 405 which may conveniently be located on control cam 395 which displaces rod 401 radially outwardly during initial movement of throttle control shaft 251, thereby compressing the spring 404, until such time as the radial upstanding peak 406 of surface 405 is reached, at which time the rod 401 acts on the radially inwardly inclined cam surface 407 thereby tending to maintain the rotational momentum of shaft 251 during the time period in question. The rod provides a degree of rotational biasing preferably until pressure contact assembly 320C achieves substantial axial concentricity with contact 350A. The rod 401 may be provided with an anti-friction cap 408 or, alternatively, a roller for purposes of minimizing friction forces produced by the cam surface 405 which could tend to effect binding of the rod 401 within housing 402.

Continued rotation of the throttle control arm 255 depresses the next sequential contact pin 375B thereby engaging spring contact 378B with collector bar 380. This permits the transfer of the potential of resistance terminal 365B to contact 350B, spring contact 378B, collector 380, and spring contact 378A to one side of capacitor C which is thus charged (FIG. 9). At this point in the operational sequence pressure contact assembly 320C is still exclusively engaging contact 350A. When the mercury pool M in pressure contact assembly 320C engages the contact 350B, the impression of the potential of contact 350B through pressure contact assembly 320C to the other side of the capacitor C discharges the capacitor C through pressure contact assembly 320A to the motor 360, the capacitor remaining available to absorb any spike which may be experienced at the time pressure contact assembly 320C is closely proximate to or engages the contact 350B.

In the course of continued rotation of throttle contact arm 255 to the full power condition wherein the pressure contact assembly 320C resides in exact axial coincidence with contact 350D, the preparatory engagement of contacts 378C and 378D prior to the engagement of contacts 350C and 350D, respectively, by pressure contact assembly 320C is effected in a manner operationally identical to that just discussed in conjunction with contact 350B.

It may be noted from a perusal of drawings and particularly FIG. 2 thereof that the mercury pool M in its travel across the contacts 350 is at various times after the engagement of contact 350A in engagement with one or at times two of the contacts, thereby producing an intermittent phasing wherein the current output through pressure contact assembly 320C constitutes a current component from two of the terminals or impedence device 365. For example, when the mercury pool M of pressure contact assembly 320C resides solely on the contact 350A the current component at motor 360 is provided exclusively through terminal 365A of impedence device 365. Shortly after mercury pool M of pressure contact assembly 320C moves into engagement with contact 350B the primary current component is supplied through terminal 365A with a lesser component of greater potential being supplied through terminal 365B and contact 350B, due to the substantially greater contact area between mercury pool M and contact 350A. As the mercury pool M continues to move on to contact 350B an increasing component of current is provided by terminal 365B until such time as mercury pool M moves off of contact 350A. At this time, the entire current component transmitted to motor 360 is provided via the higher potential terminal 365B. This phasing between each of the contacts 350A through 350D provides a relatively smooth transition in the current magnitude supplied to motor 360 despite the variations in potential necessarily existing between the terminals of impedence device 365.

It has been found that acceptable phasing may be achieved over a range of variables in regard to the size and arrangement of the contacts 350A through 350D and the relative size motion of the mercury pool M. It is, of course, essential that the mercury pool M be of greater diameter than the distance between adjacent contacts 350 and preferably substantially greater to continuously provide a substantial contact area for current flow. A smooth phasing providing a substantially uniform rate of change of electrical output has been experienced in arrangements where approximately 40 to 80 percent of the mercury pool M is in engagement with one or more contacts at all times, depending upon the potential variations between terminals of the particular impedence device 365 employed and other variables. Since the size of the contacts 350 could differ, logically progressively larger with increasing current loading and the relative motion between mercury pool M and contacts 350 could be produced by moving either or both along linear or curvilinear or combination paths, a variety of arrangements might be employed to successfully achieve the phasing characteristics herein specified.

When the throttle control arm 255 is reversed and rotated counterclockwise as seen in FIG. 2 to effect a reduction in current flow to the motor 360, the same phasing action and sequencing described above takes place in reverse order. In this respect, it should be noted that as mercury pool M disengages from contacts 350D, 350C, 350B and 350A in that order the capacitor C absorbs any spikes or fluctuation which might otherwise be produced. Thereafter, switch 385 disengages with capacitor C again operating to absorb any spike which might result. Thereafter, spring contact 378A disengages from collector 380 eliminating the potential supplied to capacitor C. The resistor R then bleeds off any residual charge which might be impressed on capacitor C such as to eliminate the possibility of overcharging of the capacitor C, thereby rendering it unable to absorb a spike.

In instances where it is desired to insure a total discharge of capacitor C when throttle control arm 255 is in the "off" position, a shorting circuit generally indicated by the numeral 410 may be provided. As shown, shorting circuit 410 consists of a switch 411 in parallel with the capacitor C (FIG. 9). The switch 411 may consist of contacts 412 and 413 which are made to close the switch and short out capacitor C in the position depicted in FIG. 8 of the drawings. As shown, contact 412 is mounted on an extending arm 414 of the control cam 395 (see FIGS. 4 and 8). As best seen in FIG. 8 contacts 412 and 413 are separated immediately upon the commencement of rotation of throttle control shaft 251 thereby opening the short across capacitor C and maintaining this condition until return of throttle control assembly 250 to the "off" position.

In instances where it may be desirable to limit the reverse speed of motor 360, such may be readily accomplished by a mechanical interengagement between direction control assembly 240 and throttle control assembly 250. As shown in FIG. 2, direction control arm 245 has a lateral extension 420 through which an adjustable stop member 421 may extend. As shown, the adjustable stop member is a threaded rod provided with nut members 422 effecting locking on either side of extension 420. The stop 421 when direction control arm 245 is in the reverse position engages an abutment 423 on the throttle control arm 255 (see FIG. 2). The distance adjustment stop 421 protrudes from extension 420 determines the extent of angular travel of throttle control arm 255 from the position depicted in FIG. 2 before it is positively retained at a preselected position short of contact of mercury pool M with contact 350D. It should, of course, be appreciated that other mechanical or electrical power limitations in the reverse and/or forward operating modes could be provided.

Two embodiments of the present invention have been described in detail by way of example in the environment of an electric switching and control device, it being understood that the subject invention could have applicability to other electrical apparatus such as electric motors or generators wherein conventional brushes could be replaced by the liquid contacts and conventional collector rings replaced by the discrete contact members.

What is claimed is:

1. An electrical control unit operative with circuit means comprising, slide surface means composed in part of electrically non-conductive material, a plurality of conductive discrete contact means arranged in said slide surface means, first conductive liquid contact means progressively and successively engaging some of said discrete contact means and connected to said circuit means to provide a variable magnitude electrical output and second conductive liquid contact means engaging other of said discrete contact means and connected to said circuit means to effect a switching operation with respect to the electrical output of said first liquid contact means.

2. A unit according to claim 1 including, means retaining said first and second liquid contact means and being in pressure contact with said slide surface means.

3. A unit according to claim 1 including means providing relative motion between both said first and second liquid contact means and slide surface means and means for independently moving said first and second liquid contact means.

4. A unit according to claim 3 wherein said means providing relative motion constitute pivot arms mounting means retaining said first and second liquid contact means.

5. A unit according to claim 4 wherein said pivot arms rotate about a common axis.

6. A unit according to claim 1 including, interlock means precluding operation of said second liquid contact means when said first liquid contact means is providing an electrical output.

7. A unit according to claim 1 including first and second pressure contact assembly means retaining said first and second liquid contact means, first and second arm means mounting said first and second pressure contact assembly means for independent rotation about a common axis, and first and second pivot means carrying said first and second arm means.

8. A unit according to claim 7 including adjustable stop means on said second arm means to selectively engage a portion of said first arm means to limit the travel of said first arm means about said first pivot means.

9. A unit according to claim 7 including control knob means attached to said second pivot means and interlock means interposed between said second arm means and said control knob means to preclude rotation of said second arm means when said first liquid contact means is engaging any of said discrete contact means.

10. A unit according to claim 9 wherein said interlock means includes a lock pin means urged into engagement with bores in said control knob means when said first arm means is rotated to bring said first liquid contact means into engagement with said discrete contact means.

11. A unit according to claim 10 wherein said lock pin means is biased into engagement with a cam surface means on said first arm means.

12. Electrical switching apparatus comprising, slide surface means composed in part of electrically nonconductive material, a plurality of conductive discrete contact means arranged in said slide surface means, at least two conductive liquid contact means for engaging said discrete contact means, means retaining said liquid contact means in contact with said slide surface means, biasing means conneted to said means retaining said liquid contact means, said means retaining said liquid contact means being resiliently biased by said biasing means against said slide surface means, support means carrying said means retaining said liquid contact means and maintaining said means retaining said liquid contact means in spaced relation, and means for effecting relative motion between said discrete contact means and said means retaining said liquid contact means to selectively bring said liquid contact means into engagement with at least two of said discrete contact means.

13. Apparatus according to claim 12 having three discrete contact means constituting two switch positions, wherein one of said discrete contact means is engaged by one of said liquid contact means in one switch position and the other liquid contact means in the other switch position and the other two of said discrete contact means are engaged in only one of the two switch positions by different of said two liquid contact means.

14. Apparatus according to claim 13 having a third switch position with said two liquid contact means engaging only the nonconductive portion of said slide surface means, thereby providing no electrical output in said third switch position.

15. Apparatus according to claim 14 including, lock means to selectively maintain said third switch position.

16. Apparatus according to claim 14 including, position alignment means in each of the three switch positions.

17. Apparatus according to claim 16 including, biasing means urging assumption of one of the two switch positions upon overcoming the position alignment means in said third switch position.

18. Apparatus according to claim 12 wherein said means retaining said liquid contact means in contact with said slide surface means and said support means maintaining said liquid contact means in spaced relation comprises pressure contact assembly means and arm means carrying said pressure contact assembly means.

19. Apparatus according to claim 18 including, a yoke portion mounting said two liquid contact means in spaced relation.

20. Apparatus according to claim 18 including, shaft means carrying said arm means for rotation therewith.

21. Apparatus according to claim 20 wherein alignment detent means cooperating with said shaft means establishes three switch positions for said liquid contact means.

22. Apparatus according to claim 21 including cam biasing means urging rotation of said shaft means from one switch position to either of the other two switch positions.

23. An electrical control unit comprising, slide surface means composed in part of electrically nonconductive material, a plurality of conductive discrete contact means arranged in said slide surface means, means connecting each of said contact means with a source of differing magnitude of electrical input, conductive liquid contact means for engaging said discrete contact means, means retaining said liquid contact means in contact with said slide surface means, and means providing relative motion between said means for retaining said liquid contact means and said discrete contact means, said liquid contact means progressively engaging one and intermittently a sufficient portion of adjacent discrete contact means to provide a substantially uniform rate of change of electrical output over the range of the differing magnitudes of electrical input.

24. A unit according to claim 23 wherein, said means for retaining said liquid contact means in contact with said slide surface means is maintained in pressure engagement with said slide surface means.

25. A unit according to claim 24 wherein the pressure engagement is effected by a pressure contact assembly.

26. A unit according to claim 25 wherein the pressure contact assembly has a wiper encapsulating conductive liquid and having a surface of self-lubricating polymeric material engaging said slide surface means.

27. A unit according to claim 26 wherein said wiper and a sleeve maintain the conductive liquid in a generally conical configuration.

28. A unit according to claim 26, wherein a portion of the conductive liquid is maintained in a reservoir having a biased piston as one wall thereof to compensate for expansion and contraction of the conductive liquid.

29. A unit according to claim 26 wherein the conductive liquid is mercury.

30. A unit according to claim 26 wherein said side surface means is a glass filled phenolic.

31. A unit according to claim 23, wherein more than 40 percent of the engaging surface of said liquid contact means engages one or more of said discrete contact means after initial contact therewith.

32. A unit according to claim 23, wherein said liquid contact means has an engaging surface along its direction of travel of greater extent than the distance between any two adjacent discrete contact means.

33. A unit according to claim 23, having balancing circuitry means which condition said discrete contact means prior engagement and disengagement by said liquid contact means.

34. A unit according to claim 33 wherein said balancing circuitry means is controlled by cam means.

35. A unit according to claim 33 wherein said balancing circuitry means includes preconditioning capacitive reactance means.

36. A unit according to claim 35 having resistance means for stabilizing said capacitive reactance means.

37. A unit according to claim 35 including switch means for selectively shorting said capacitive reactance means.

38. A unit according to claim 35 including collector means effecting charging of said capacitive reactance means.

39. A unit according to claim 38 including switch means bringing said liquid contact means to substantially the same potential as each of said discrete contact means prior to engagement therewith and effecting discharge of said capacitive reactance means.

40. An electrical device comprising, surface means composed in part of electrically nonconductive material, a plurality of conductive discrete contact means arranged in said surface means, conductive liquid contact means for engaging said discrete contact means, means retaining said liquid contact means in contact with said surface means, means connected to said retaining means for biasing said means retaining said liquid contact means in pressure engagement with said slide surface means, and means providing relative movement between said means for retaining said liquid contact means and said discrete contact means, said liquid contact means normally engaging at least one of said discrete contact means during the relative movement between said means retaining said liquid contact means and said discrete contact means.

41. An electrical device according to claim 40 wherein said conductive liquid contact means has an engaging surface along its direction of travel of greater extent than the distance between any two adjacent of said discrete contact means.

42. A unit according to claim 1 wherein said first conductive liquid contact means progressively engages one and intermittently a portion of adjacent of said discrete contact means.

\* \* \* \* \*